US010686631B2

(12) United States Patent
Xie et al.

(10) Patent No.: US 10,686,631 B2
(45) Date of Patent: Jun. 16, 2020

(54) RECEIVER AND RECEIVING METHOD USING QUADRATURE SPATIAL MODULATION TECHNOLOGY, AND RELEVANT WIRELESS COMMUNICATION SYSTEM

(71) Applicants: CHONGQING BOE SMART ELECTRONICS SYSTEM CO., LTD., Chongqing (CN); BOE TECHNOLOGY GROUP CO., LTD., Beijing (CN)

(72) Inventors: Yunyan Xie, Beijing (CN); Lichun Chen, Beijing (CN); Bo Liu, Beijing (CN); Shuang Wang, Beijing (CN); Bei Xu, Beijing (CN)

(73) Assignees: CHONGQING BOE SMART ELECTRONICS SYSTEMS CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/534,021

(22) Filed: Aug. 7, 2019

(65) Prior Publication Data
US 2020/0052935 A1    Feb. 13, 2020

(30) Foreign Application Priority Data

Aug. 8, 2018 (CN) .......................... 2018 1 0899004

(51) Int. Cl.
*H04L 25/03* (2006.01)
*H04L 27/38* (2006.01)
*H04B 7/08* (2006.01)

(52) U.S. Cl.
CPC ......... *H04L 25/03242* (2013.01); *H04B 7/08* (2013.01); *H04L 27/38* (2013.01)

(58) Field of Classification Search
CPC ................ H04B 7/0413; H04B 7/2649; H04L 25/03242
See application file for complete search history.

(56) References Cited

U.S. PATENT DOCUMENTS 9,813,278 B1 *  11/2017  Meslelh ................. H01L 27/34

OTHER PUBLICATIONS

A. Younis et al, "Generalised Sphere decoding for spatial modulation," IEEE Transactions on Communications, vol. 61, No. 7, Jul. 2013 (Year: 2013).*

* cited by examiner

*Primary Examiner* — Kevin Kim
(74) *Attorney, Agent, or Firm* — Calfee, Halter & Griswold LLP (57) ABSTRACT

A method for receiving a signal in a wireless communication system includes: receiving and demodulating a signal transmitted by using a quadrature spatial modulation technology to obtain a complex symbol; and decoding the complex symbol with a spherical decoding detection algorithm. Decoding includes, for the $i^{th}$ layer of a constellation symbol, discarding the constellation symbol if a calculated radius of the $i^{th}$ layer is greater than a minimum radius of the $i^{th}$ layer; otherwise updating the minimum radius of the $i^{th}$ layer according to the calculated radius; where i is a natural number in a range between Nr and 1; Nr is the number of receiving antennas; and for each constellation symbol that is not discarded, taking a sum of the radii of respective layers of the constellation symbol as the radius of the constellation symbol, and selecting a constellation symbol with the smallest radius as a symbol obtained from the decoding.

20 Claims, 4 Drawing Sheets

RECEIVER AND RECEIVING METHOD USING QUADRATURE SPATIAL MODULATION TECHNOLOGY, AND RELEVANT WIRELESS COMMUNICATION SYSTEM

CROSS REFERENCE TO RELATED APPLICATIONS

The present application claims the benefit of Chinese Patent Application No. 201810899004.6, filed on Aug. 8, 2018, the entire disclosures of which are incorporated herein by reference.

FIELD

The present disclosure relates to the technical field of wireless communications, and specifically to a receiver using quadrature spatial modulation technology, a receiving method and a relevant wireless communication system.

BACKGROUND

MIMO (Multiple-Input Multiple-Output) technology means using multiple transmitting antennas and receiving antennas to transmit and receive signals at a transmitter and a receiver, respectively, to improve the communication quality.

SM (Spatial Modulation) technology, as one of branch technologies of MIMO technology, is also a new multi-antenna transmission scheme, which introduces a spatial dimension into an information bit modulation process, so that only one transmitting antenna is in a working state to transmit data at any time slot, and a portion of the transmitted information bits are mapped to a conventional digital modulation constellation, and the remaining bits are mapped to a spatial dimension generated by the antenna serial number. The SM technology introduces the spatial dimension, increases the Euclidean distance between constellation symbols, and improves the error code performance of the system to some extent. Therefore, the SM technology has gradually become a research hotspot in the field of wireless communication.

Compared with the traditional MIMO technology, the spatial modulation technology avoids inter-channel interference and improves system performance, but its spectral efficiency may only increases in a logarithmic manner (in a non-linear manner). In addition, when the SM technology activates the antennas, the antennas need to be selected constantly. The transmitting antennas need to remain in an antenna selected state for a long time, and a delay in symbol transmission might be caused by pulse shaping upon the switching of the transmitting antennas. Therefore, the SM technology limits the fast switching of the system RF links, and is limited by a high-speed data transmission system.

In view of some drawbacks of the SM technology, the concept of quadrature spatial modulation (QSM) technology is proposed. According to the QSM technology, a real part of a transmission symbol is separated from its imaginary part. Since the QSM technology maintains the advantages of the SM technology while improving the spectrum efficiency of the system, the overhead of the system does not significantly increase.

However, it has been found from practical application that the existing communication system based on QSM technology has a relatively low transmission rate on account of a large amount of calculation, which limits the practical application of the QSM technology-based communication systems.

SUMMARY

Embodiments of the present disclosure provide a method for receiving a signal in a wireless communication system. The method comprises: receiving a signal via a receiving antenna, the signal being transmitted from a transmitting end by using a quadrature spatial modulation QSM technology; demodulating a received signal to obtain a received complex symbol; and decoding the received complex symbol with a spherical decoding detection algorithm to obtain the signal that is transmitted. The decoding comprises: hierarchically calculating from bottom to top a radius of each layer for each constellation symbol in a given constellation symbol search space based on the received complex symbol; for the $i^{th}$ layer of the constellation symbol, discarding the constellation symbol if a calculated radius of the $i^{th}$ layer of the constellation symbol is greater than a minimum radius of the $i^{th}$ layer, otherwise updating the minimum radius of the $i^{th}$ layer according to the calculated radius of the $i^{th}$ layer of the constellation symbol, wherein i is a natural number in a range between Nr and 1, and Nr is the number of receiving antennas; and for each constellation symbol that is not discarded, taking a sum of radii of respective layers of the constellation symbol as a radius of the constellation symbol, and selecting a constellation symbol with the smallest radius as a symbol obtained from the decoding.

In certain exemplary embodiments, the radius of the $i^{th}$ layer of the constellation symbol is obtained by removing, from an initial radius, a detected radius redundancy for the $Nr^{th}$ layer to the $i+1^{th}$ layer of the constellation symbol and an estimated radius redundancy for the $i-1^{th}$ layer to the first layer of the constellation symbol.

In certain exemplary embodiments, the radius of the $i^{th}$ layer of the constellation symbol is obtained by calculating a Euclidean distance between a complex symbol received by the $i^{th}$ receiving antenna and the constellation symbol.

In certain exemplary embodiments, the estimated radius redundancy for the $i-1^{th}$ layer to the first layer of the constellation symbol is determined according to a mean redundancy calculated according to distribution of radius redundancies of the $i-1^{th}$ layer to the first layer of the constellation symbol.

In certain exemplary embodiments, the estimated radius redundancy for the $i-1^{th}$ layer to the first layer of the constellation symbol is determined according to a mean value of radius redundancies of the $Nr^{th}$ layer to the $i+1^{th}$ layer of the constellation symbol.

In certain exemplary embodiments, the estimated radius redundancy for the $i-1^{th}$ layer to the first layer of the constellation symbol is determined according to a larger one of a mean redundancy calculated according to distribution of radius redundancies of the $i-1^{th}$ layer to the first layer of the constellation symbol and a mean value of radius redundancies of the $Nr^{th}$ layer to the i+1layer.

In certain exemplary embodiments, after selecting a constellation symbol with the smallest radius as a symbol obtained from the decoding, the method further comprises: searching for a corresponding transmitting antenna according to the symbol obtained from the decoding; and composing a final decoding result of the complex symbol according to the symbol obtained from the decoding and a serial number of the corresponding transmitting antenna.

Embodiments of the present disclosure further provide a receiver in a wireless communication system. The receiver comprises a demodulator and a decoder. The demodulator is configured to demodulate a signal received by a receiving antenna to obtain a received complex symbol. The decoder is configured to decode the received complex symbol with a spherical decoding detection algorithm by: hierarchically calculating from bottom to top a radius of each layer for each constellation symbol in a given constellation symbol search space, based on the received complex symbol; for the $i^{th}$ layer of the constellation symbol, discarding the constellation symbol if a calculated radius of the $i^{th}$ layer of the constellation symbol is greater than a minimum radius of the $i^{th}$ layer; otherwise updating the minimum radius of the $i^{th}$ layer according to the calculated radius of the $i^{th}$ layer of the constellation symbol; wherein i is a natural number in a range between Nr and 1, and Nr is the number of receiving antennas; and for each constellation symbol that is not discarded, taking a sum of the radii of respective layers of the constellation symbol as the radius of the constellation symbol and selecting a constellation symbol with the smallest radius as a symbol obtained from the decoding.

In certain exemplary embodiments, the decoder is configured to obtain the radius of the layer of the constellation symbol by removing, from an initial radius, a detected radius redundancy for the $Nr^{th}$ layer to the $i+^{th}$ layer of the constellation symbol and an estimated radius redundancy for the $i-1^{th}$ layer to the first layer of the constellation symbol.

In certain exemplary embodiments, the decoder is configured to obtain the radius of the $i^{th}$ layer of the constellation symbol by calculating a Euclidean distance between a complex symbol received by the receiving antenna and the constellation symbol.

In certain exemplary embodiments, the decoder is configured to determine the estimated radius redundancy for the $i-1^{th}$ layer to the first layer of the constellation symbol according to a mean redundancy calculated according to distribution of radius redundancies of the $i-1^{th}$ layer to the first layer of the constellation symbol.

In certain exemplary embodiments, the decoder is configured to determine the estimated radius redundancy for the $i-1^{th}$ layer to the first layer of the constellation symbol according to a mean value of radius redundancies of the $Nr^{th}$ layer to the $i+1^{th}$ layer of the constellation symbol.

In certain exemplary embodiments, the decoder is configured to determine the estimated radius redundancy for the $i-1^{th}$ layer to the first layer of the constellation symbol according to a larger one of a mean redundancy calculated according to distribution of radius redundancies of the $i-1^{th}$ layer to the first layer of the constellation symbol and a mean value of radius redundancies of the $Nr^{th}$ layer to the $i+1^{th}$ layer.

In certain exemplary embodiments, the decoder is configured to, after selecting a constellation symbol with the smallest radius as the symbol obtained from the decoding, search for a corresponding transmitting antenna according to the symbol obtained from the decoding; and compose a final decoding result of the complex symbol according to the symbol obtained from the decoding and a serial number of the corresponding transmitting antenna.

Embodiments of the present disclosure further provide a wireless communication system. The wireless communication system comprises: a transmitter for transmitting a signal by using QSM technology and the abovementioned receiver.

Embodiments of the present disclosure further provide an electronic shelf label system. The electronic shelf label system comprises a server and electronic shelf labels. The serve is configured to provide label information. The label information is carried by a signal modulated and transmitted by using quadrature spatial modulation technology. The electronic shelf labels include the abovementioned receiver for receiving the signal from the server that is modulated with the quadrature spatial modulation technology, and demodulating and decoding the signal to obtain the label information.

BRIEF DESCRIPTION OF THE DRAWINGS

The present disclosure will be further described in detail below in conjunction with specific embodiments and with reference to figures to make objects, technical solutions and advantages of the present disclosure more apparent.

DETAILED DESCRIPTION

The embodiments of the present disclosure will be described in detail below, and examples of the embodiments are illustrated in the figures, wherein the same or like reference numerals are used to refer to the same or like elements or elements having the same or like functions throughout the description. The embodiments described below with reference to the figures are exemplary and are intended to illustrate the present disclosure only, and cannot be construed as limiting the present disclosure.

Those skilled in the art may appreciate that unless otherwise specified, singular forms "a", "one", "said" and "the" used herein may also include plural forms. It should be further appreciated that when we say an element is "connected" or "coupled" to another element, it means that the element may be directly connected or coupled to the another element, or there may exist an intermediate element. In addition, "connected" or "coupled" as used herein may include either wireless connection or wireless coupling. The wording "and/or" used herein includes all or any unit or all combinations of one or more associated listed items.

It needs to be appreciated that all the expressions using "first" and "second" in the embodiments of the present disclosure are used to distinguish between two different entities or different parameters with the same terminology. It may be seen that "first" and "second" are only for ease of description and should not be understood as limiting embodiments of the present disclosure.

It has been found from practical application that the existing communication system based on QSM technology has a relatively low transmission rate particularly on account of large amount of calculation for decoding at a receiving end, so it is difficult for the communication system to be applied to some scenarios requiring high transmission reliability as well as a high transmission rate. For example, in an electronic shelf label (ESL) system, a transceiving manner of wireless communication is crucial for reliable and high-speed information interaction between an electronic price tag and a server. The existing QSM technology-based communication system has advantages such as small channel interference and high spectral efficiency, but due to its low transmission rate, it cannot complete the information interaction between the electronic shelf label and the server in time, and thus cannot be applied to the ESL system.

After analyzing a maximum likelihood (ML) decoding detection algorithm used in the decoding method at a receiving end in a QSM technology-based communication system in the related art, the Inventor found that the ML decoding detection algorithm requires to perform traverse search and calculate Euclidean distances to the received signal for all constellation symbols and receiving antennas, thereby causing a large amount of calculation. Thus, it has been recognized that applying a spherical decoding detection algorithm to a receiver of a QSM technology-based communication system to perform optimal decoding may reduce the amount of calculation. Based on the traversal search detection algorithm, the spherical decoding detection algorithm limits its search space in order to limit the number of constellation symbols that are searched. Here, the search space may be a spatial scope within a given "sphere" space, in which symbol information is searched. The constellation symbol may refer to symbol information in each quadrant of a corresponding constellation map with respect to different modulation manners. According to the spherical decoding detection algorithm, for each constellation symbol, hierarchical calculation and a search from bottom to top are performed. Here, the hierarchical calculation assumes that each transmitted symbol is divided into multiple layers for reception, and a radius of each layer is calculated upon reception of said each layer. For example, when the number of receiving antennas is Nr, each symbol may be defined to be divided into Nr layers for reception. If it is found from the search that a current layer is not in the given "sphere", the constellation symbol of the current search is directly discarded, thereby reducing the computational complexity of the algorithm.

According to the solution of an embodiment of the present disclosure, further improvement and optimization is performed on the basis of the spherical decoding detection algorithm, so as to further reduce the amount of calculation and achieve the purpose of further improving the transmission rate of the system.

Figure 1:
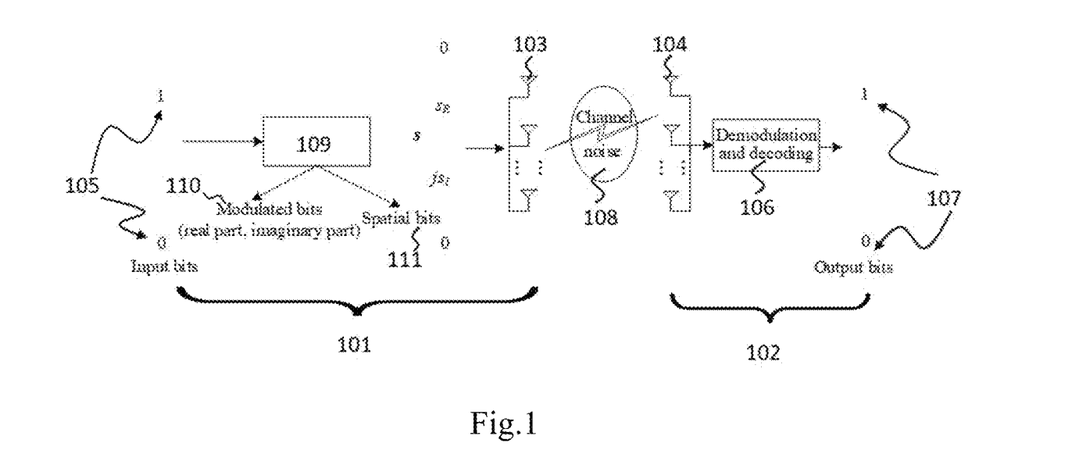
FIG. 1 is a schematic structural diagram of a wireless communication system according to an embodiment of the present disclosure.

FIG. 1 illustrates a wireless communication system in which an optimized solution according to an embodiment of the present disclosure may be applied. As shown in FIG. 1, the wireless communication system 100 includes a transmitter 101 and a receiver 102. The transmitter uses the QSM technology, which can be in a QSM modulator 109, for signal transmission, including using the QSM technology for encoding and modulation. The number of transmission bits of the wireless communication system is $m_{QSM} = \log_2(Nt^2) + \log_2(M)$, where Nt is the number of transmitting antennas 103 of the transmitter, and M is the number of modulated constellation symbols; wherein, a QSM system model may be expressed as: $y = Hx + n = (h_{l_R} x_R + j h_{l_I} x_I) + n$; where $x_R$ is a real part of a transmitted symbol, $x_I$ is an imaginary part of the transmitted symbol, $h_{l_R}$ is column $l_R$ of a complex channel gain matrix H, namely, a column vector which is of the complex channel matrix H and corresponds to a row in the transmitted symbol column vector x where the real part symbol $x_R$ lies, and likewise, $h_{l_I}$ is a column vector which is of the complex channel matrix H and corresponds to a row in the column vector x where the imaginary part symbol $x_I$ lies (assuming that channel information is already known); n is a complex additive Gaussian white noise vector with a mean value 0 and a variance $\sigma_n^2$.

A modulation mode in the QSM technology adopted by the transmitter is QAM modulation. For example, assuming that a 2×2 antenna system is employed, i.e., Nt=Nr=2, where Nt represents the number of transmitting antennas 103 of the transmitter, and Nr represents the number of receiving antennas 104 of the receiver. The following shows a mapping table using such an antenna system and using a modulation mode of a quadrature spatial modulation system under 4 QAM modulation. According to the QSM technology mapping rule, the antenna/symbol mapping relationship in the system may be as shown in the following table (Table 1), including input bits 105, modulated bits 110, and spatial bits 111.

TABLE 1

QSM mapping table according to 4QAM modulation, Nt = Nr = 2

| Input bits | Spatial bits | Antenna serial No. 1 | Antenna serial No. 2 | Modulation bits | Constellation symbol | Output symbol |
|---|---|---|---|---|---|---|
| 0000 | 00 | 1 | 1 | 00 | −1 − j | (−1 − j, 0) |
| 0001 | 00 | 1 | 1 | 01 | −1 + j | (−1 + j, 0) |
| 0010 | 00 | 1 | 1 | 10 | +1 − j | (+1 − j, 0) |
| 0011 | 00 | 1 | 1 | 11 | +1 + j | (+1 + j, 0) |
| 0100 | 01 | 1 | 2 | 00 | −1 − j | (−1, −j) |
| 0101 | 01 | 1 | 2 | 01 | −1 + j | (−1, +j) |
| 0110 | 01 | 1 | 2 | 10 | +1 − j | (+1, −j) |
| 0111 | 01 | 1 | 2 | 11 | +1 + j | (+1, +j) |
| 1000 | 10 | 2 | 1 | 00 | −1 − j | (−j, −1) |
| 1001 | 10 | 2 | 1 | 01 | −1 + j | (+j, −1) |
| 1010 | 10 | 2 | 1 | 10 | +1 − j | (−j, +1) |
| 1011 | 10 | 2 | 1 | 11 | +1 + j | (+j, +1) |
| 1100 | 11 | 2 | 2 | 00 | −1 − j | (0, −1 − j) |
| 1101 | 11 | 2 | 2 | 01 | −1 + j | (0, −1 + j) |
| 1110 | 11 | 2 | 2 | 10 | +1 − j | (0, +1 − j) |
| 1111 | 11 | 2 | 2 | 11 | +1 + j | (0, +1 + j) |

It may be seen from the above table that in the first four cases and the last four cases in the table, the real part and imaginary part of the constellation symbol simultaneously select the same activated transmitting antenna. In other cases, the real part and imaginary part of the constellation symbol respectively select two different transmitting antennas for activation. For example, at a certain time, the input bits 105 are "0110", the first two bits "0" and "1" are respectively serial numbers "1" and "2" of two transmitting antennas to be activated, and the last two bits "10" correspond to the modulation constellation symbol "+1− j ". At this time, the antenna "1" corresponds to the real part "+1" of the constellation symbol, and the antenna "2" corresponds to the imaginary part "−j" of the constellation symbol, so the output symbol is (+1,−j).

After passing through the wireless communication channel 108, the signal transmitted by the transmitting antennas 103 is received by Nr receiving antennas 104 at the receiver 102, and the received signal is subjected to corresponding demodulation and decoding 106. A method of decoding the received signal may employ any suitable known decoding technology. The received signal may be decoded by using the spherical decoding detection algorithm, so that the system may reduce the amount of calculation of the algorithm while ensuring the reliability, reduce requirements for hardware devices and further enhance the transmission efficiency of the system.

Figure 2:
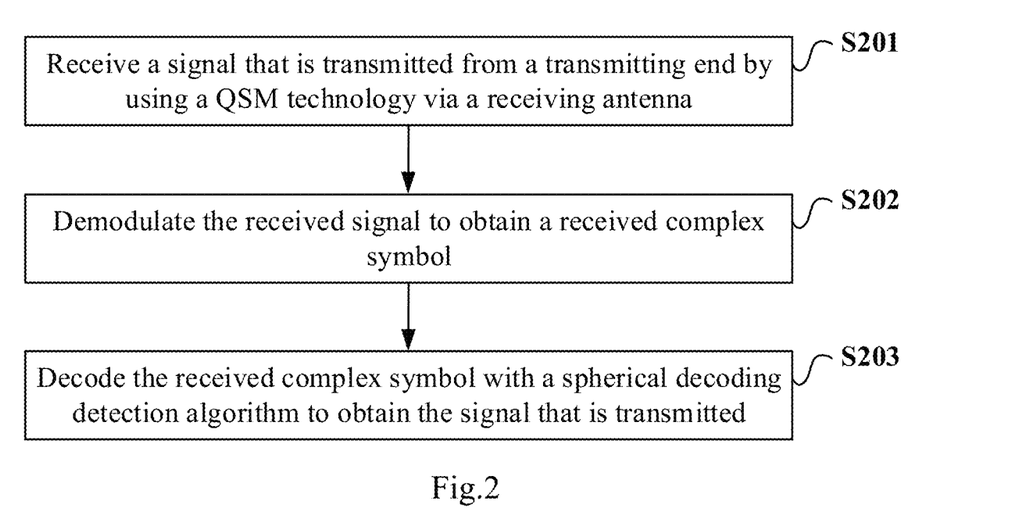
FIG. 2 is a flowchart of a signal receiving method of a receiver of a wireless communication system according to an embodiment of the present disclosure.

FIG. 2 illustrates a method for receiving a signal at a receiver of a wireless communication system in accordance with an embodiment of the present disclosure.

Step S201: a signal transmitted by the transmitter with the QSM technology is received via a receiving antenna.

Step S202: the received signal is demodulated to obtain a received complex symbol. Exemplarily, a radio frequency signal received by the receiving antenna may be demodulated to obtain a complex symbol of a baseband.

Step S203: decoding the received complex symbol with a spherical decoding detection algorithm to obtain the signal that is transmitted.

Since the spherical decoding detection algorithm is adopted for the received signal, the system may reduce the amount of calculation during the decoding while ensuring the reliability, and therefore reduce requirements for hardware devices and further enhance the transmission efficiency of the system.

Figure 3:
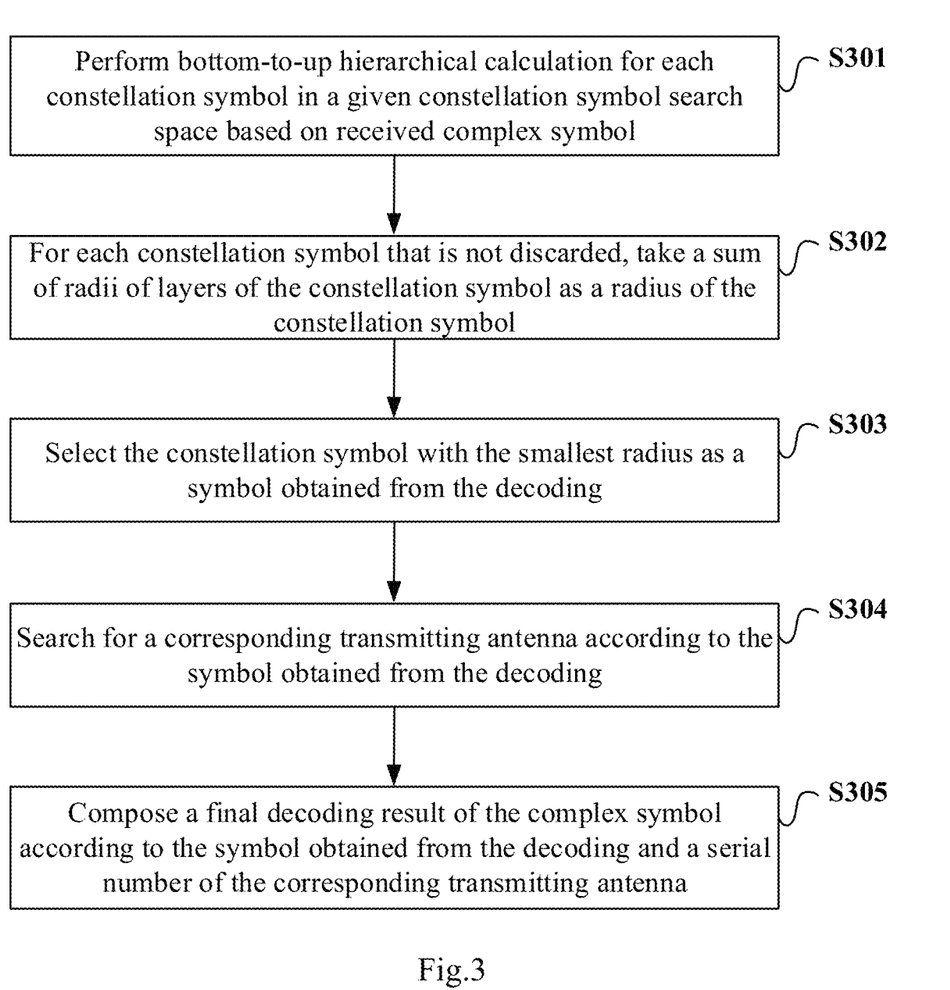
FIG. 3 is a flowchart of a method of obtaining transmitted information by using a spherical decoding detection algorithm to decode a received complex symbol according to an embodiment of the present disclosure.

FIG. 3 shows a flow of a method for decoding a received complex symbol using a spherical decoding detection (Rx-SD, Receiver-centric SD) algorithm.

Step S301: bottom-up hierarchical calculation processing is performed for each constellation symbol in a given constellation symbol search space based on the received complex symbol. If a radius of a current layer of the current constellation symbol obtained from the calculation is greater than a minimum radius of the current layer, the constellation symbol is discarded. Otherwise, the minimum radius of the current layer is updated according to the radius of the current layer of the constellation symbol. Exemplarily, the minimum radius of the current layer may be initially set to $2Nr\ \delta^2$, where $\delta^2$ is complex Gaussian white noise.

In some embodiments, for each constellation symbol within a given constellation symbol search space, it may be determined whether the radius of the current layer of the constellation symbol satisfies a preset condition when the radius of each layer of the constellation symbol is calculated hierarchically from bottom to top. For example, when the current layer is the $i^{th}$ layer, the constellation symbol is directly discarded if the radius of the $i^{th}$ layer of the constellation symbol is greater than the minimum radius of the $i^{th}$ layer thereof and then the preset condition is not satisfied. Otherwise, the minimum radius of the $i^{th}$ layer is updated according to the radius of the $i^{th}$ layer of the constellation symbol. Here, i is a natural number in a range between Nr and 1; and Nr is the number of receiving antennas.

Figure 4:
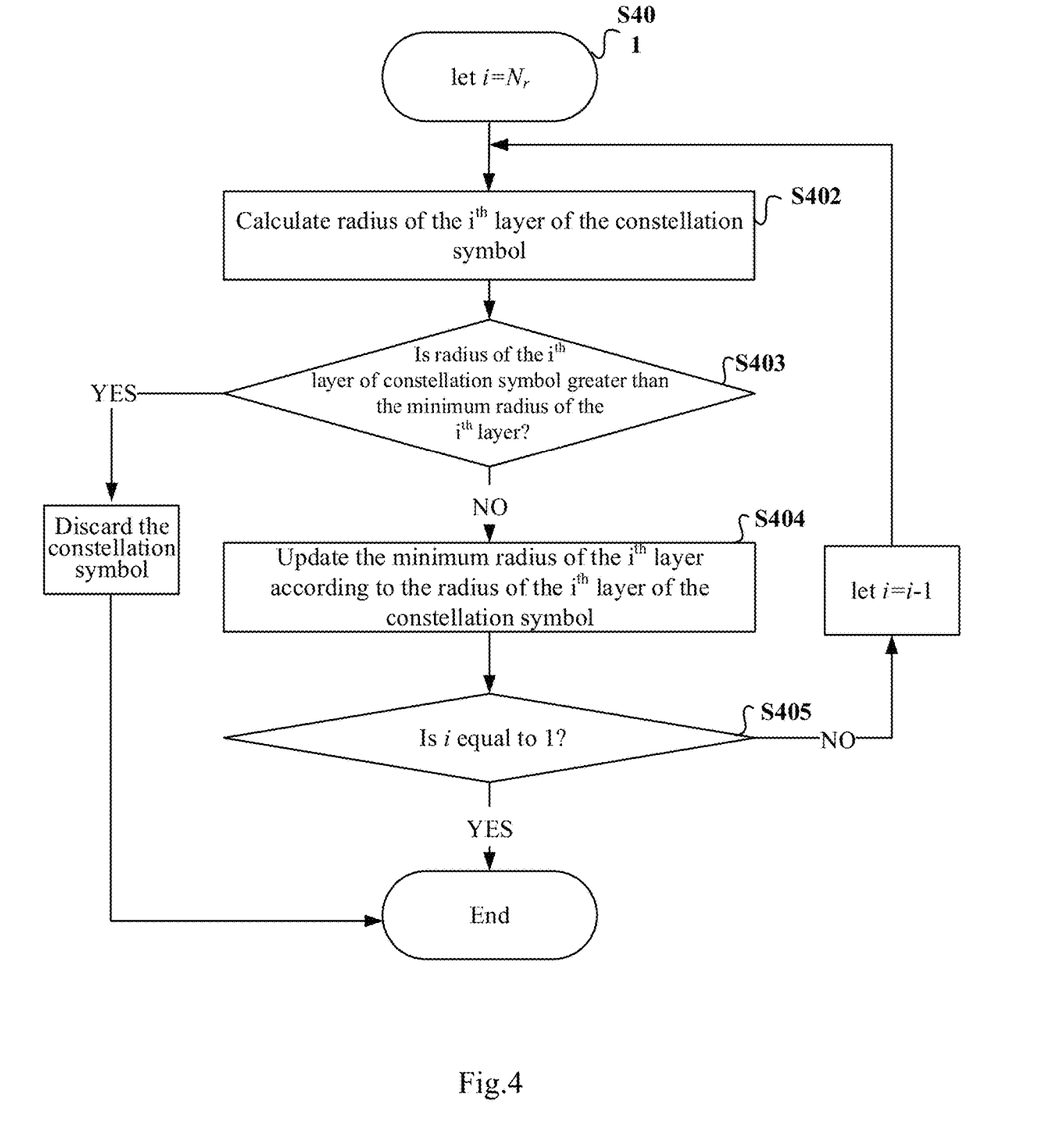
FIG. 4 is a flowchart of a process of performing search processing for each layer of a constellation symbol according to an embodiment of the present disclosure.

FIG. 4 illustrates an exemplary search process for a respective layer of a constellation symbol.

Sub-step S401: let i=Nr , where i represents the layer number of the current layer of the constellation symbol.

Sub-step S402: the radius of the $i^{th}$ layer of the constellation symbol is calculated.

In some embodiments, a method for calculating a radius of the $i^{th}$ layer of a constellation symbol may be: calculating the radius of the $i^{th}$ layer of the constellation symbol according to a Euclidean distance between a complex symbol received by the $i^{th}$ receiving antenna and the constellation symbol.

Sub-step S403: judgement as to whether the radius of the $i^{th}$ layer of the constellation symbol is greater than the minimum radius of the $i^{th}$ layer thereof is performed. If yes, discarding the constellation symbol; otherwise, proceeding to the following sub-step S404.

Sub-step S404: the minimum radius of the $i^{th}$ layer is updated according to the radius of the $i^{th}$ layer of the constellation symbol.

Here, the minimum radius of the $i^{th}$ layer reflects a minimum Euclidean distance between the complex symbol received by the $i^{th}$ receiving antenna and the currently searched constellation symbol.

Sub-step S405: judgement as to whether i is equal to 1 is performed; if no, let i=i−1, and jumping to sub-step S402; if yes, ending the flow.

Since the minimum radius of each layer may be constantly updated during the constellation symbol search, the constellation symbols satisfying the preset condition become less and less, or the number of layers of the constellation symbols satisfying the preset condition becomes less and less. This may allow to directly discard certain constellation symbol(s), thereby reducing the computational complexity of the algorithm, reducing the amount of calculation, and achieving the purpose of improving transmission efficiency.

Description will now return to the flowchart of FIG. 3.

Step S302: for each constellation symbol that is not discarded, a sum of the radii of respective layers of the constellation symbol is taken as the radius of the constellation symbol.

Step S303: the constellation symbol with the smallest radius is selected as a symbol obtained from the decoding.

Step S304: a corresponding transmitting antenna is searched according to the symbol obtained from the decoding.

In this step, a corresponding transmitting antenna may be found by searching based on the symbol obtained from the decoding and according to a preset mapping relationship.

Step S305: a final decoding result of the complex symbol is composed according to the symbol obtained from the decoding and a serial number of the corresponding transmitting antenna that is searched/found, thereby obtaining a transmitted signal.

In other embodiments, in order to further reduce the amount of calculation, another method (referred to as RNSD algorithm) for calculating a radius of the $i^{th}$ layer of a constellation symbol is also provided in the technical solution of the present disclosure.

According to the RNSD algorithm, the radius of the i layer of the constellation symbol is obtained by removing, from an initial radius, a detected radius redundancy for $Nr^{th}$ layer to $i+1^{th}$ layer of the constellation symbol and an estimated radius redundancy for the $i-1^{th}$ layer to the first layer of the constellation symbol, wherein the radius redundancy for the $i+1^{th}$ layer to the first layer is obtained by estimating according to the radius redundancy for the $Nr^{th}$ layer to $i+1^{th}$ layer.

The RNSD algorithm further reduces the computational complexity of the algorithm on the basis of Rx-SD. Since there is a large amount of noise redundancy in calculation of radius in Rx-SD, a mathematical model of Rx-SD is thus expanded and analyzed to obtain a lot of redundancy information in the calculated radius, which redundancy information is to be removed in order to further accelerate radius update speed in spherically-decoding, while guaranteeing accuracy of a updated radius. Since the noise in the Rayleigh wireless channel is complex Gaussian random noise, a mean estimation method is employed in the present disclosure to estimate partial radius redundancy of an undetected layer(s) according to radius redundancy of a detected layer(s) of the constellation symbol. This further reduces the radius redundancy of each layer of the constellation symbol, thereby reducing the iterated minimum radius of each layer and in turn reducing the amount of calculation of the algorithm and achieving the purpose of further improving the transmission efficiency.

In some embodiments, a mathematical model of the known Rx-SD algorithm is expanded to obtain a model shown in the following inequality 1:

$$|y_1-(jh_{1,l_R}s_I+h_{1,l_R}s_R)|^2+|y_2-(jh_{2,l_I}s_I+h_{2,l_R}s_R)|^2+$$
$$+|y_i-(jh_{E,l_I}s_I+h_{i,l_R}s_R)|^2+$$
$$+|y_{N_r}-(jh_{Nr,l_I}s_I+h_{Nr,l_R}s_R)|^2 \leq C_R^2 \quad \text{(Inequality 1)}$$

where $y_i$ is a signal (complex symbol) received by the $i^{th}$ receiving antenna, $h_{i,l_I}$ is the imaginary part channel information of the $i^{th}$ receiving antenna, $h_{i,l_R}$ is the real part channel information of the $i^{th}$ receiving antenna, and $s_I$ is the real part of a transmitted symbol s, $s_R$ is the imaginary part of a transmitted symbol s; $C_R$ is an initial radius of the RNSD (same as the initial radius of the Rx-SD), $C_R=2N'\delta^2$, where $\sigma^2$ is the complex additive Gaussian white noise vector of the channel matrix.

To facilitate viewing, $|y_i-(jh_{i,i_I}s_I+h_{i,l_R}s_R)|$ in the above inequality 1 is represented as $\rho_i$, and the Inequality 1 may be represented as:

$$\rho_1^2\rho_2^2+\ldots+\rho_{Nr}^2 \leq C_R^2 \quad \text{(Inequality 2)}$$

The $i^{th}$ layer of any constellation symbol may be expressed as the following Inequality 3:

$$\rho_i^2 \leq C_R^2-(\rho_{Nr}^2\rho_{Nr-1}^2+\ldots+\rho_{i-1}^2) \quad \text{(Inequality 3)}$$

For the amount of radius redundancy of the $i^{th}$ layer during the search process, the radius redundancy for the $i-1^{th}$ layer to the first layer may be obtained as $$\sum_{m=1}^{i-1}\rho_m^2$$

by estimating a mean. In the present disclosure, a mean value of radius redundancies of the $Nr^{th}$ layer to the $i+1^{th}$ layer is employed to estimate a radius redundancy for the layer to the first layer of the current constellation symbol to obtain a radius R, of the $i^{th}$ layer of the constellation symbol, which is expressed as the following Equation 1:

$$R_i^2 = C_R^2 - (i-1)\overline{\sum_{n=i+1}^{Nr}\rho_n^2} - \sum_{n=i+1}^{Nr}\rho_n^2 \quad \text{(Equation 1)}$$

Where $$\sum_{n=i+1}^{Nr}\rho_n^2$$

redundancy of the $Nr^{th}$ layer to the $i+1^{th}$ layer (already-detected layers) of the current constellation symbol, and $$(i-1)\overline{\sum_{n=i+1}^{Nr}\rho_n^2}$$

represents the estimated radius redundancy for undetected layers (the $i-1^{th}$ layer to the first layer).

In still other embodiments, a further algorithm for calculating the radius of the $i^{th}$ layer of the constellation symbol is provided to further reduce the amount of calculation.

As stated above, during searching on a layer-by-layer basis, only the redundancy of the previously searched layers, namely, $\Sigma_{n=i+1}^{Nr}\rho_n^2$ is known, whereas the redundancy of the unsearched layers, namely, $\Sigma_{n=1}^{i}\rho_n^2$ is unknown. However, the Inventor has found through research that $\Sigma_{i=1}^{k}\rho_i^2/\sigma_n^2$ obeys a non-central chi-square distribution with a degree of freedom k, where the degree of freedom k is determined by the number of square terms participating in accumulation, and $\sigma_n^2$ represents the complex additive Gaussian white noise of the channel matrix. Therefore, although there are unknown redundancies of layers, this distribution may be utilized to calculate a mean value of redundancies of the unknown/undetected layers as follows:

$$E(\chi^2(\delta_k(<l_R, l_I>, <s_R, s_I>), Nr)) =$$
$$\frac{1}{\sigma_n^2}\sum_{i=1}^{Nr}E(\rho_i^2(<l_R, l_I>, <s_R, s_I>)) =$$
$$\frac{1}{\sigma_n^2}\sum_{i=1}^{Nr}[E^2(\rho_i(<l_R, l_I>, <s_R, s_I>))+$$
$$D(\rho_i(<l_R, l_I>, <s_R, s_I>))] =$$
$$\frac{1}{\sigma_n^2}\sum_{i=1}^{Nr}[u_i'^2(<l_R, l_I>, <s_R, s_I>)+\sigma_n^2] =$$
$$k + \delta'_{Nr}(<l_R, l_I>, <s_R, s_I>)$$

In the above formula, $u_i'=\rho_i-n_i$, wherein $n_i$ is noise, $E(\bullet)$ represents an expected operator, $D(\bullet)$ represents a variance operator, and $\chi^2(\bullet)$ represents a chi-square distribution, $\delta_k$ represents a non-central factor, which is defined herein as $$\delta_k'=\Sigma_{i=1}^{k}\mu_i'^2;$$

K represents the degree of freedom of the chi-square distribution, and $\sigma_n^2$ represents the complex additive Gaussian white noise of the channel matrix;

$S_R$, $S_I$ represent the real part and the imaginary part of the transmitted symbol s, respectively, and $l_R$, $l_I$ respectively represent the serial number of the transmitting antennas corresponding to $s_R$, $s_I$.

According to this algorithm, a mean redundancy for the unknown layers of the constellation symbol may be obtained. Therefore, when the radius of the current layer is calculated, the redundancies of the unknown layers may be estimated according to the mean redundancy calculated according to the distribution of the radius redundancies of the $i-1^{th}$ to the first layers of the constellation symbol, so that they may be removed from the initial radius.

Alternatively, it is also possible to compare the redundancy estimated according to redundancies of the known layers with the mean redundancy calculated according to the distribution of the radius redundancies, and select a larger one from the two redundancies and subtract it from the initial radius. Thus, the radius of the $i^{th}$ layer of the constellation symbol may be calculated as:

$$R_i^2 = C_R^2 - \sum_{n=i+1}^{Nr} \rho_n^2 - (i-1)\max\left(\sum_{n=i+1}^{Nr} \rho_n^2, (k+\delta'_{Nr}(<l_R, l_I>, <s_R, s_I>))/Nr\right)$$

Equation 2

The radius of the current layer obtained in this way is compared with the minimum radius of the current layer, and the smaller value is selected as the radius of the current layer for decoding calculation.

In this way, it allows to remove a lot of noise redundancies obtained according to the above calculating method from radii of respective layers of the constellation symbol, thereby further reducing the radii of the respective layers of the constellation symbol and then achieving the purpose of reducing the minimum radii of the respective layers. Since constellation symbols or layers of the constellation symbols satisfying the preset condition are further reduced, and the amount of calculation is reduced accordingly. During a process of constellation symbol search, the redundancy in the search process is greatly reduced, and the search process for each layer of the constellation symbol enables the radius of each layer to be updated constantly. Therefore, theoretically speaking, the amount of calculation of each layer is reduced relatively, and the reduction of the redundancy is particularly outstanding for layers which are searched at first. It is known from the above analysis that in the whole search process of the algorithm, the number of calculations is substantially reduced, and then the amount of calculation is substantially reduced. Meanwhile, since reduction of a updated radius is more remarkable and what is reduced is the redundancy, almost no impact is caused to performance of the detection algorithm.

Figure 5:
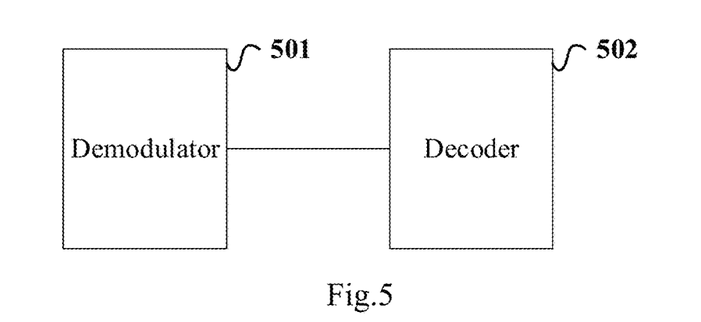
FIG. 5 is a block diagram showing an internal structure of a receiver of a wireless communication system according to an embodiment of the present disclosure.

FIG. 5 is a structural block diagram showing a receiver of a wireless communication system according to an embodiment of the present disclosure. As shown in FIG. 5, the receiver includes a demodulator 501 and a decoder 502.

The demodulator 501 is configured to demodulate a signal received by a receiving antenna(s) to obtain a received complex symbol. The signal is a signal transmitted by a transmitter using QSM technology.

The decoder 502 is configured to decode the received complex symbols with a spherical decoding detection (Rx-SD) algorithm to obtain the signal that is transmitted.

In some embodiments, the decoder 502 is configured to, upon hierarchically calculating from bottom to top radii of layers for each constellation symbol in a given constellation symbol search space, discard the constellation symbol if a radius of the $i^{th}$ layer of the constellation symbol is greater than a minimum radius of the $i^{th}$ layer; otherwise update the minimum radius of the $i^{th}$ layer according to the radius of the $i^{th}$ layer of the constellation symbol. For each constellation symbol that is not discarded, a sum of the radii of respective layers of the constellation symbol is taken as the radius of the constellation symbol, and then a constellation symbol with the smallest radius is selected as a symbol obtained from the decoding. A corresponding transmitting antenna is searched for according to the symbol obtained from the decoding. A final decoding result of the complex symbol is composed according to the symbol obtained from the decoding and a serial number of the corresponding transmitting antenna. Here, i is a natural number in a range between Nr and 1; and Nr is the number of receiving antennas. The radius of the layer of the constellation symbol is obtained by calculating according to a Euclidean distance between the complex symbol received by the $i^{th}$ receiving antenna and the constellation symbol.

In certain exemplary embodiments, the decoder 502 may employ an improved spherical decoding detection (RNSD) algorithm for decoding so as to obtain the transmitted signal. The decoder 502 may be configured to obtain the radius of the $i^{th}$ layer of the constellation symbol by removing, from an initial radius, a detected radius redundancy for $Nr^{th}$ layer to $i+1^{th}$ layer of the constellation symbol and an estimated radius redundancy for the $i-1^{th}$ layer to the first layer of the constellation symbol, wherein the radius redundancy for the $i-1^{th}$ layer to the first layer is obtained by estimating according to a mean value of the radius redundancies of the $Nr^{th}$ layer to $i+1^{th}$ layer.

In systems in the relevant art, a large-screen electronic shelf label usually contains about 100 kB data, and a small-screen electronic shelf label usually contains about 20 kB data. Thus, it takes about 40 seconds to send data to the large-screen label, and in order to send data to the small-screen label, it takes more than 10 s from establishment of the connection to completion of data transmission. During this period, the user is in an awaiting state all the time, so the user's experience is undesirable.

Figure 6:
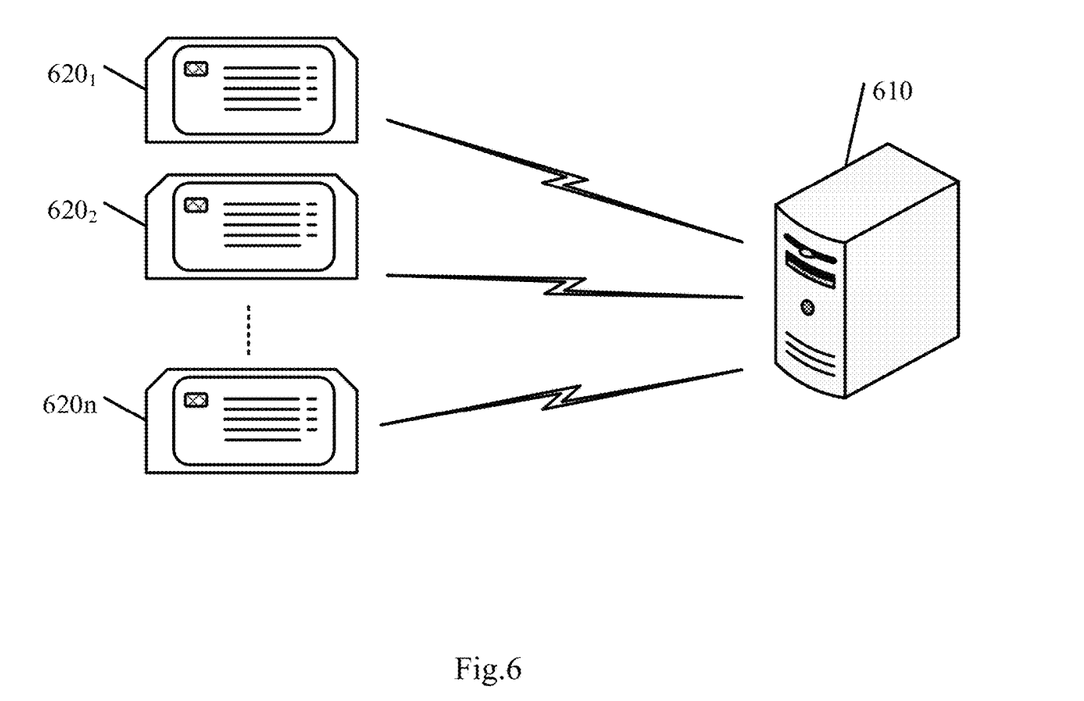
FIG. 6 is a schematic structural diagram of an electronic shelf label ESL system according to an embodiment of the present disclosure.

FIG. 6 shows a schematic structural diagram of an electronic shelf label ESL system according to an embodiment of the present disclosure. As shown in FIG. 6, the electronic shelf label system includes a server 610 and electronic shelf labels $620_1$, $620_2$, ..., $620_n$.

The server 610 is configured to send label information to the electronic shelf labels $620_1$, $620_2$, ..., $620_n$. The label information is configured to be carried by a signal modulated with quadrature spatial modulation technology and be transmitted to the electronic shelf label.

The electronic shelf labels $620_1$, $620_2$, ..., $620_n$ may be large-screen labels or small-screen labels. The electronic shelf labels $620_1$, $620_2$, ..., $620_n$ include a receiver in accordance with an embodiment of the present disclosure for receiving, demodulating, and decoding a signal from the server 610 that is modulated with the quadrature spatial modulation technology in order to obtain the label information transmitted by the server 610.

According to an embodiment of the present disclosure, since the QSM technology is employed at the transmitting end (i.e., at the server), the amount of data the can be transmitted during a same time period is increased. At the same time, use of an improved spherical decoding detection algorithm at the receiving end (i.e., at the electronic shelf label) reduces the computational complexity in the decoding process, saves transmission time, and therefore improves transmission efficiency. In this way, the ESL system according to the embodiment of the present disclosure may quickly complete information interaction between an electronic price label and a server by means of wireless communication transceiving, thereby achieving a better user experience.

In a QSM system with 16 QAM modulation and 4 QAM modulation, a comparative experiment is performed for an existing ML decoding detection algorithm and the Rx-SD algorithm and RNSD algorithm of the present disclosure in terms of the error code performance in the environment of flat Rayleigh channel and complex additive Gaussian white noise. The experiment proves that error code performance curves of the Rx-SD and RNSD in the QSM system completely coincide with the error code performance curve of the ML detection algorithm, no matter whether the 4 QAM modulation or 16 QAM modulation is employed. This shows that both the Rx-SD and RNSD guarantee system performance while reducing the computational complexity of the detection process and accelerating wireless transmission.

In a QSM system with Nr receiving antennas, where Nr is 3, 4 or 5, respectively, a comparative experiment is performed for an existing ML decoding detection algorithm and the Rx-SD algorithm and RNSD algorithm of the present disclosure in terms of the error code performance in the environment of flat Rayleigh channel and complex additive Gaussian white noise. The experiment proves that error code performance curves of the Rx-SD and RNSD in the QSM system completely coincide with the error code performance curve of the ML detection algorithm, in cases where different numbers of receiving antennas are employed. Therefore, both the Rx-SD and RNSD guarantee system performance while reducing the computational complexity of the detection process and accelerating wireless transmission.

In a QSM system with Nr receiving antennas, where Nr is 2 or 8, respectively, a comparative experiment is performed for an existing ML decoding detection algorithm and the Rx-SD algorithm and RNSD algorithm of the present disclosure in terms of the error code performance in the environment of flat Rayleigh channel and complex additive Gaussian white noise. The experiment proves that error code performance curves of the Rx-SD and RNSD in the QSM system completely coincide with the error code performance curve of the ML detection algorithm, in cases where different numbers of transmitting antennas are employed. Therefore, both the Rx-SD and RNSD guarantee system performance while reducing the computational complexity of the detection process and accelerating wireless transmission.

In a QSM system with 16 QAM modulation, where Nr=Nt=4, a comparative experiment is performed between the decoding detection algorithm of the present disclosure and a ML detection algorithm in terms of reduction of computational complexity. A percentage of the reduction of complexity of the decoding detection algorithm of the present disclosure relative to the ML detection algorithm may be expressed as:

$$C_{re} = \frac{100 \times (C_{ML} - C_{SD})}{C_{ML}};$$

in the above formula, $C_{re}$ is the ordinate: the percentage of the reduction of the complexity relative to the ML decoding detection algorithm;

wherein $C_{ML}$ is the number of Monte Carlo simulation calculations when the ML detection algorithm is performed 100,000 times;

$C_{SD}$ is the number of Monte Carlo simulation calculations when the decoding detection algorithm currently employed in the present disclosure is performed 100,000 times.

Experiments prove that the computational complexity of Rx-SD detection algorithm in the QSM system reduces by more than 70% compared with the ML detection algorithm under a high signal-to-noise ratio (SNR≥20 dB) condition, while the computational complexity of RNSD reduces by over 80% as compared with the ML detection algorithm.

In a QSM system with 4 QAM modulation and Nr=5 and Nt=8, the computational complexity of Rx-SD detection algorithm in the QSM system reduces by more than 70% compared with the ML detection algorithm under a high signal-to-noise ratio (SNR≤20 dB) condition, while the computational complexity of RNSD reduces by over 85% as compared with the ML detection algorithm.

It can be seen that by applying the decoding detection algorithm according to the technical solution of the embodiment of the present disclosure to the receiver of the QSM technology-based communication system, the optimized decoding may be performed under the premise of ensuring the error code rate performance, and the amount of calculation is reduced.

While certain embodiments are described herein, other embodiments are available, and the described embodiments should not be used to limit the claims. Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product can be used along with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations.

The term computer readable media as used herein can include computer storage media. Computer storage media can include volatile and nonvolatile, removable and non-removable media implemented in any method or technology for storage of information, such as computer readable instructions, data structures, program modules, etc. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, but not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components can include any type, number, and/or combination of networks and the corresponding network components include, but are not limited to, wide area networks (WANs), local area networks (LANs), metropolitan area networks (MANs), proprietary networks, backend networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable and/or scripting code. Exemplary components include an application, a server running on the application, and/or an electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to carry computer-readable information as part of transmitting, receiving, and/or rendering electronic communication items using a communication network or networks such as the Internet for example. Other embodiments and configurations are included and available.

Although the disclosure has been described in connection with various exemplary embodiments, those of ordinary skill in the art will understand that many modifications can be made thereto within the scope of the claims that follows. Accordingly, it is not intended that the scope of the disclosure in any way be limited by the above description, but instead be determined entirely by reference to the claims that follows.

The invention claimed is:

1. A method for receiving a signal in a wireless communication system, the method comprising:
   receiving a signal via a receiving antenna, the signal being transmitted from a transmitting end by using a quadrature spatial modulation QSM technology;
   demodulating a received signal to obtain a received complex symbol; and
   decoding the received complex symbol with a spherical decoding detection algorithm to obtain the signal that is transmitted, the decoding comprising:
      hierarchically calculating from bottom to top a radius of each layer for each constellation symbol in a given constellation symbol search space based on the received complex symbol;
      for an $i^{th}$ layer of the constellation symbol, discarding the constellation symbol if a calculated radius of the $i^{th}$ layer of the constellation symbol is greater than a minimum radius of the $i^{th}$ layer, otherwise updating the minimum radius of the $i^{th}$ layer according to the calculated radius of the $i^{th}$ layer of the constellation symbol, wherein i is a natural number in a range between Nr and 1, and Nr is a number of receiving antennas; and
      for each constellation symbol that is not discarded, taking a sum of the radii of respective layers of the constellation symbol as a radius of the constellation symbol, and selecting a constellation symbol with a smallest radius as a symbol obtained from the decoding.

2. The method according to claim 1, wherein the radius of the $i^{th}$ layer of the constellation symbol is obtained by removing, from an initial radius, a detected radius redundancy for an $Nr^{th}$ layer to an $i+1^{th}$ layer of the constellation symbol and an estimated radius redundancy for an $i+1^{th}$ layer to a first layer of the constellation symbol.

3. The method according to claim 1, wherein the radius of the $i^{th}$ layer of the constellation symbol is obtained by calculating a Euclidean distance between a complex symbol received by an $i^{th}$ receiving antenna and the constellation symbol.

4. The method according to claim 2, wherein the estimated radius redundancy for the $i-1^{th}$ layer to the first layer of the constellation symbol is determined according to a mean redundancy calculated according to distribution of the radius redundancies of the $i-1^{th}$ layer to the first layer of the constellation symbol.

5. The method according to claim 2, wherein the estimated radius redundancy for the $i-1^{th}$ layer to the first layer of the constellation symbol is determined according to a mean value of the radius redundancies of the $Nr^{th}$ layer to the $i+1^{th}$ layer of the constellation symbol.

6. The method according to claim 2, wherein the estimated radius redundancy for the $i-1^{th}$ layer to the first layer of the constellation symbol is determined according to a larger one of a mean redundancy calculated according to distribution of the radius redundancies of the $i-1^{th}$ layer to the first layer of the constellation symbol and a mean value of radius redundancies of the $Nr^{th}$ layer to the $i+1^{th}$ layer.

7. The method according to claim 1, wherein after selecting a constellation symbol with the smallest radius as the symbol obtained from the decoding, the method further comprises:
   searching for a corresponding transmitting antenna according to the symbol obtained from the decoding; and
   composing a final decoding result of a complex symbol according to the symbol obtained from the decoding and a serial number of the corresponding transmitting antenna.

8. A receiver in a wireless communication system, comprising:
   a demodulator configured to demodulate a signal received by a receiving antenna to obtain a received complex symbol; and
   a decoder configured to decode the received complex symbol with a spherical decoding detection algorithm by:
      hierarchically calculating from bottom to top a radius of each layer for each constellation symbol in a given constellation symbol search space based on the received complex symbol; for an $i^{th}$ layer of the constellation symbol, discarding the constellation symbol if a calculated radius of the $i^{th}$ layer of the constellation symbol is greater than a minimum radius of the $i^{th}$ layer; otherwise updating the minimum radius of the $i^{th}$ layer according to the calculated radius of the $i^{th}$ layer of the constellation symbol, wherein i is a natural number in a range between Nr and 1, and Nr is a number of receiving antennas; and for each constellation symbol that is not discarded, taking a sum of the radii of respective layers of the constellation symbol as the radius of the constellation symbol and selecting a constellation symbol with a smallest radius as a symbol obtained from the decoding.

9. The receiver according to claim 8, wherein the decoder is configured to obtain the radius of the layer of the constellation symbol by removing, from an initial radius, a detected radius redundancy for an $Nr^{th}$ layer to an $i+^{th}$ layer of the constellation symbol and an estimated radius redundancy for an $i-1^{th}$ layer to a first layer of the constellation symbol.

10. The receiver according to claim 8, wherein the decoder is configured to obtain the radius of the $i^{th}$ layer of the constellation symbol by calculating a Euclidean distance between a complex symbol received by the receiving antenna and the constellation symbol.

11. The receiver according to claim 9, wherein the decoder is configured to determine the estimated radius redundancy for the $i-1^{th}$ layer to the first layer of the constellation symbol according to a mean redundancy calculated according to distribution of the radius redundancies of the $i-1^{th}$ layer to the first layer of the constellation symbol.

12. The receiver according to claim 9, wherein the decoder is configured to determine the estimated radius redundancy for the $i-1^{th}$ layer to the first layer of the constellation symbol according to a mean value of radius redundancies of the $Nr^{th}$ layer to the $i+1^{th}$ layer of the constellation symbol.

13. The receiver according to claim 9, wherein the decoder is configured to determine the estimated radius redundancy for the $i-1^{th}$ layer to the first layer of the constellation symbol according to a larger one of a mean redundancy calculated according to distribution of the radius redundancies of the $i-1^{th}$ layer to the first layer of the constellation symbol and a mean value of radius redundancies of the $Nr^{th}$ layer to the $i+1^{th}$ layer.

14. The receiver according to claim 8, wherein the decoder is configured to, after selecting a constellation symbol with the smallest radius as the symbol obtained from the decoding, search for a corresponding transmitting antenna according to the symbol obtained from the decoding; and compose a final decoding result of a complex symbol according to the symbol obtained from the decoding and a serial number of the corresponding transmitting antenna.

15. A wireless communication system, comprising: a transmitter for transmitting a signal by using QSM technology and a receiver according to claim 8.

16. An electronic shelf label system, comprising:
a server configured to provide label information, the label information being carried by a signal that is modulated and transmitted by using quadrature spatial modulation technology; and
a electronic shelf label comprising a receiver according to claim 8 for receiving the signal from the server that is modulated with the quadrature spatial modulation technology, and demodulating and decoding the signal to obtain the label information.

17. The electronic shelf label system according to claim 16, wherein the decoder is configured to obtain the radius of the $i^{th}$ layer of the constellation symbol by removing, from an initial radius, a detected radius redundancy for an $Nr^{th}$ layer to an $i+1^{th}$ layer of the constellation symbol and an estimated radius redundancy for the $i-1^{th}$ layer to a first layer of the constellation symbol.

18. The electronic shelf label system according to claim 17, wherein the decoder is configured to determine the estimated radius redundancy for the $i-1^{th}$ layer to the first layer of the constellation symbol according to a mean redundancy calculated according to distribution of the radius redundancies of the $i-1^{th}$ layer to the first layer of the constellation symbol.

19. The electronic shelf label system according to claim 17, wherein the decoder is configured to determine the estimated radius redundancy for the $i-1^{th}$ layer to the first layer of the constellation symbol according to a mean value of radius redundancies of the $Nr^{th}$ layer to the $i+1^{th}$ layer of the constellation symbol.

20. The electronic shelf label system according to claim 17, wherein the decoder is configured to determine the estimated radius redundancy for the $i-1^{th}$ layer to the first layer of the constellation symbol according to a larger one of a mean redundancy calculated according to distribution of the radius redundancies of the $i-1^{th}$ layer to the first layer of the constellation symbol and a mean value of radius redundancies of the $Nr^{th}$ layer to the $i+1^{th}$ layer.

* * * * *

UNITED STATES PATENT AND TRADEMARK OFFICE
CERTIFICATE OF CORRECTION

PATENT NO. : 10,686,631 B2  
APPLICATION NO. : 16/534021  
DATED : June 16, 2020  
INVENTOR(S) : Yunyan Xie et al.

Page 1 of 1

It is certified that error appears in the above-identified patent and that said Letters Patent is hereby corrected as shown below:

On the Title Page

Please correct the name of the Assignee in item (73) to read as follows:  
CHONGQING BOE SMART ELECTRONICS SYSTEM CO., LTD.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*